United States Patent [19]
Manteufel

[11] Patent Number: 4,558,881
[45] Date of Patent: Dec. 17, 1985

[54] TRACTOR-MOUNTED IMPLEMENT HITCH ARRANGEMENT

[75] Inventor: Dale A. Manteufel, Hortonville, Wis.
[73] Assignee: Ingersoll Equipment Co., Inc., Winneconne, Wis.
[21] Appl. No.: 540,276
[22] Filed: Oct. 11, 1983
[51] Int. Cl.$^4$ .............................................. B60D 1/00
[52] U.S. Cl. ................................ 280/460 A; 280/497; 172/443; 172/448; 403/57; 403/79
[58] Field of Search .......... 280/461 A, 460 A, 456 R, 280/497, 490; 180/14.4, 14.3; 172/439, 448, 443; 403/53, 78, 57, 58, 79

[56] References Cited
U.S. PATENT DOCUMENTS

| | | | |
|---|---|---|---|
| 1,617,908 | 2/1927 | Hughson | 464/171 |
| 1,854,195 | 4/1932 | Hufferd | 403/57 |
| 3,106,253 | 10/1963 | Silver | 172/439 |
| 3,280,919 | 10/1966 | Bunting | 280/460 A |
| 4,239,085 | 12/1980 | Venable | 280/456 R |
| 4,365,488 | 12/1982 | Mochida | 403/57 |

FOREIGN PATENT DOCUMENTS 1500179  2/1978  United Kingdom ................ 172/439

Primary Examiner—Joseph F. Peters, Jr.
Assistant Examiner—Everett G. Diederiks, Jr.
Attorney, Agent, or Firm—Dressler, Goldsmith, Shore, Sutker & Milnamow, Ltd.

[57] ABSTRACT

An improved, integrated three-point hitch arrangement is disclosed which includes a mounting arrangement for conveniently effecting a fixed connection to a tractor or the like. The hitch includes a pair of upper and lower arms pivotally connected to a mounting plate, with a pair of adjustable-length link members respectively interconnecting the upper and lower arms. Connector means are provided which permit limited relative pivotal movement of each link member with respect to the respective one of the upper arms about first and second perpendicular axes, with the connector means as permitting limited relative vertical movement of the link members to accommodate "floating" of the hitch-mounted implement. The integrated nature of the present hitch permits it to be very easily mounted on an associated tractor, with the mounting arrangement preferably configured to accommodate mounting on different tractor models.

18 Claims, 7 Drawing Figures

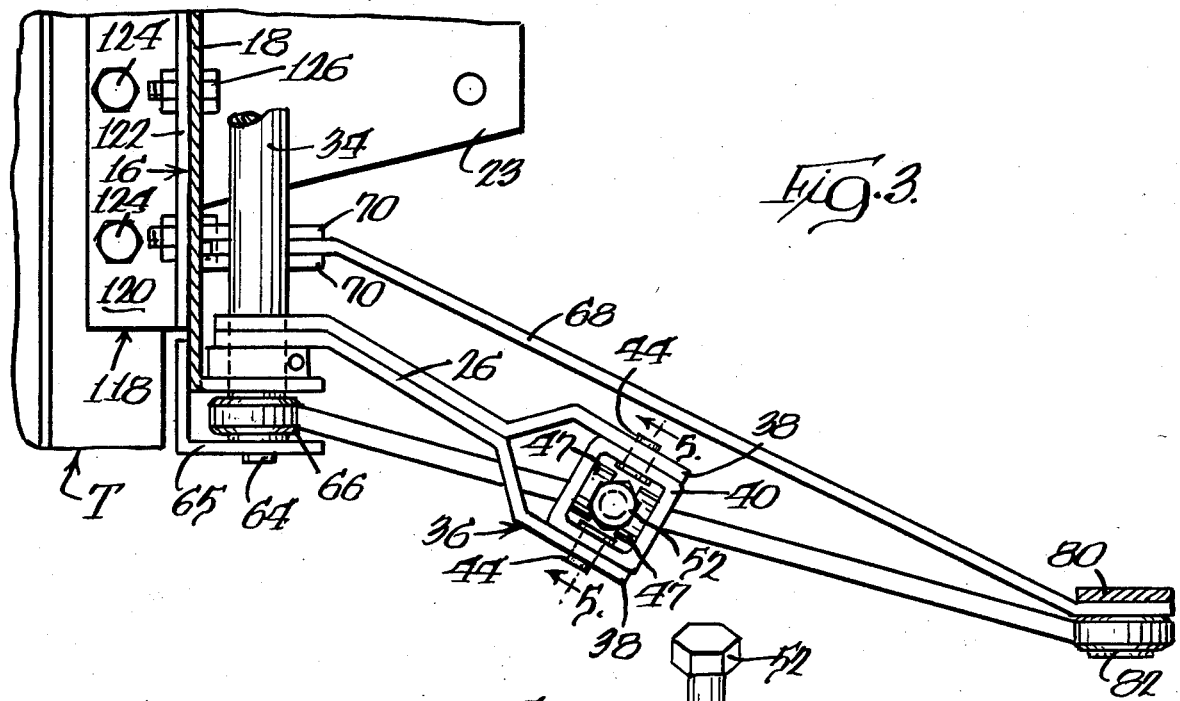
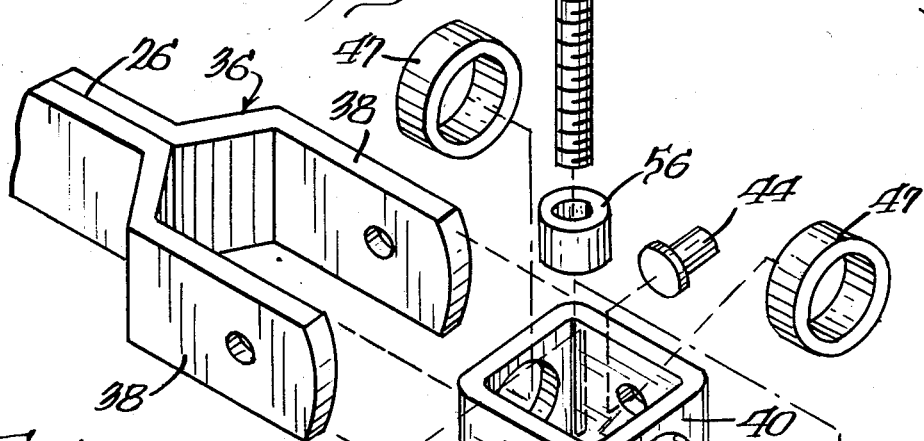
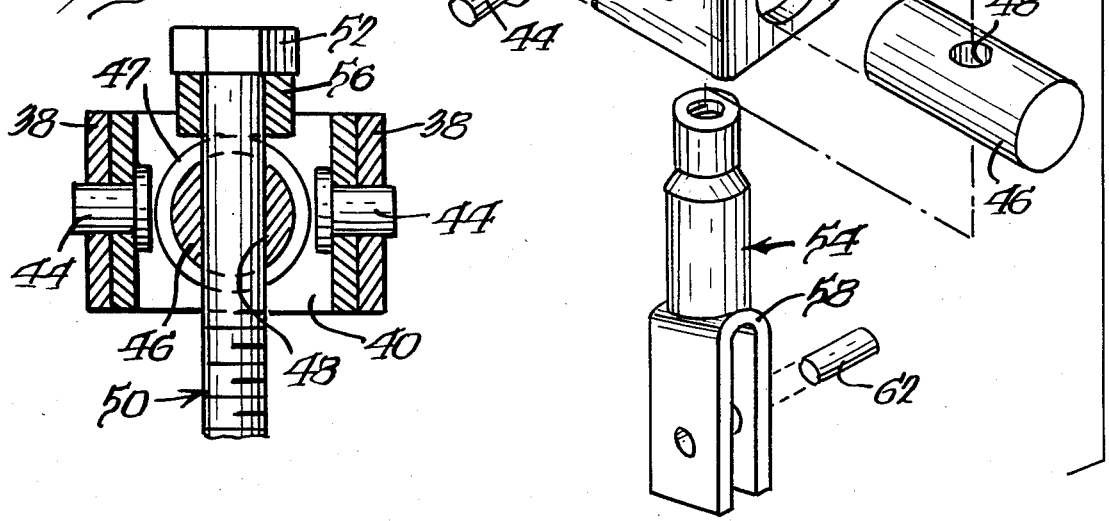

TRACTOR-MOUNTED IMPLEMENT HITCH ARRANGEMENT

FIELD OF THE INVENTION

The present invention relates generally to arrangements for mounting implements to tractors, and more particularly to an integrated three-point hitch arrangement for mounting implements to tractors.

BACKGROUND OF THE INVENTION

The versatility of tractors and like equipment is in part provided by tractor-supported hitch arrangements which permit attachment of a wide variety of implements to a tractor. Hitch arrangements of this nature may be provided for tractors of various sizes, and typically include arrangements for mounting implements at the front and rear of a tractor. One well-known hitching arrangement is the so-called three-point hitch, which supports an implement at the rear of the tractor at a pair of laterally spaced lower points and a centrally disposed upper point, usually in adjustable fashion.

While various three-point hitch arrangements are available for adjusting and maintaining the position of an attached implement, there is substantial room for improvement. Previously used three-point hitch arrangements typically provide movement of the hitch and attached implement in the vertical plane with respect to the ground, but do not always accommodate forces in a horizontal plane with respect to the ground. Further, some previously used three-point hitch arrangements do not include provisions to allow the hitch and attached implement to "float" with respect to the ground, thereby following or tracking the contour of the surface. In addition, most previous hitches are typically configured for use on one type of tractor, and cannot be easily interchanged or adapted for use on other tractor models.

Movement of an implement mounted on a three-point hitch in both the vertical and horizontal planes relative to the ground is desirable so as to provide height adjustability of the implement, and to accommodate for side forces exerted on the implement during use. Furthermore, it is highly desirable to provide such universal or bi-directional movement in a convenient, uncomplicated and straightforward manner, allowing the three-point hitch to be relatively inexpensively fabricated for use on smaller, less expensive garden tractors and the like.

In adapting a three-point hitch for operation in response to forces exerted in both vertical and horizontal planes, a limiting arrangement is desirable to prevent overextension of the hitch in either of the planes, thus preventing damage to the three-point hitch or to the implement attached thereto. It is also desirable to provide floating of the hitch and attached ground engaging implement to allow relative vertical movement of the implement with respect to the ground in response to unevenness of the ground, thus obviating the need for previously used complicated and expensive draft sensing systems to maintain efficient operation of the implement below the surface of the ground.

Mounting of previously used three-point hitch arrangements has typically been accomplished by fixed connection of the hitch with the tractor model with which the hitch is particularly configured for use. For added versatility, it would be desirable to provide an integrated three-part hitch with a mounting arrangement which provides compatibility with more than one type of tractor, and which is relatively easy to mount and detach from a tractor. Such an improved integrated three-point hitch arrangement enhances the efficiency and versatility of the tractor and an implement mounted thereto.

SUMMARY OF THE INVENTION

The three-point hitch arrangement of the present invention provides desired adjustability of the hitch and an attached implement, and thus facilitating convenient and efficient use. The hitch arrangement is also preferably configured to accommodate side or lateral forces exerted on the implement without damage. Additionally, this invention provides desired floating of the hitch and implement there attached allowing the implement to adjust its position with respect to the contour of the surface of the ground.

The present three-point hitch arrangement includes improved integrated mounting means for connecting the three-point hitch to a tractor or the like. The improved mounting arrangement facilitates easy attachment and detachment of the three-point hitch to tractors or other material handling equipment. Further, attachment of the three-point hitch can desirably be made at generally the same elevation above the ground on different pieces of equipment having attachment points at different elevations.

The present three-point hitch arrangement includes a pair of upper arms, and a pair of lower arms spaced below the upper arms, both pairs of arms being pivotally connected to a mounting plate adapted for detachable mounting on the tractor. The present hitch arrangement further includes a pair of link members respectively interconnecting the upper and lower arms. A connector member comprising a rectangular connector block attached to each of the upper arms provides relative pivotal movement of the link members about respective first and second axes, generally perpendicular to each other, thereby permitting lateral movement of the hitch-mounted implement in response to side loading. The upper and lower arm pairs of the three-point hitch arrangement of the present invention are raised and lowered in unison by a hydraulically powered acuator operatively connected to the pair of upper arms and to the mounting plate.

In the illustrated embodiment, the pair of link members comprise a pair of shafts respectively connecting one upper arm with one lower arm, with each shaft connected to one of the connecting members. Each connecting member includes a connector pin extending through and pivotally mounted on the rectangular connector block for relative pivotal movement about the respective second axis. Each shaft extends through a bore within the respective connector pin and is relatively movable therethrough, thus providing limited relative vertical movement to permit floating of the hitch-mounted implement. The connector pin of each connector member carries a pair of spacing members disposed on respective opposite sides of the shaft extending therethrough to maintain the connector pin in a centered disposition relative to its connector block.

Each shaft includes a head portion at one end and a threaded portion at its other end which is adjustably connected with respective clevis member pivotally connected to each of the lower arms, thus allowing the length of each link member to be conveniently adjusted.

A protective spacer is also included at each connector member which is positioned about the respective shaft between the head portion of the shaft and the spacing members on the connector pin through which the shaft extends. The protective spacer is adapted to contact the connector block for limiting movement of the shaft about the respective second axis, and prevents the shaft from being damaged by contact with the block.

The integrated mounting arrangement for the three-point hitch arrangement of the present invention includes an invertible bracket arrangement so that the mounting plate and the three-point hitch can be easily mounted on different tractors having attachment points at different heights, although the three-point hitch is positioned at generally the same elevation regardless of which material handling equipment device or tractor it is mounted on. The bracket arrangement includes an invertible bracket which is preferably generally L-shaped. The bracket is adapted to effect a releasably fixed connection to the tractor, as well as to the hitch's mounting plate.

In a first position of the mounting bracket, the mounting plate of the three-point hitch can be connected to the bracket so that the hitch can be mounted in a first, relatively low position with respect to the attachment points on the tractor. In a second, inverted position of the bracket, the mounting plate can be affixed to the bracket so that the three-point hitch is mounted in a second, relatively high position with respect to the attachment points of the tractor. This is a desirable feature of the present invention since it maintains the selected range of relative vertical movement of the ground engaging implement attached to the three-point hitch, even when the three-point hitch is mounted on different tractors.

Other features and advantages of the invention will be apparent from the following description and claims, and the accompanying drawings which show structure embodying illustrated features of the present invention and the principles thereof.

BRIEF DESCRIPTION OF THE DRAWINGS

FIG. 3 is a view taken generally along plane 3—3 of FIG. 2 illustrating one side of the three-point hitch arrangement of the present invention;

FIG. 4 is an exploded perspective view of one of the connector blocks of the present three-point hitch arrangement showing details of connection to one of the upper arms;

FIG. 5 is an enlarged cross-sectional view taken along plane 5—5 of FIG. 3;

DESCRIPTION OF THE PREFERRED EMBODIMENT

Although the invention in its broader aspects has many advantageous features and many applications, it will be described in a presently illustrated specific embodiment. The illustrated embodiment is included merely to aid in the understanding of the invention and variations may be made by one skilled in the art without departing from the spirit and scope of the invention.

Figure 1:
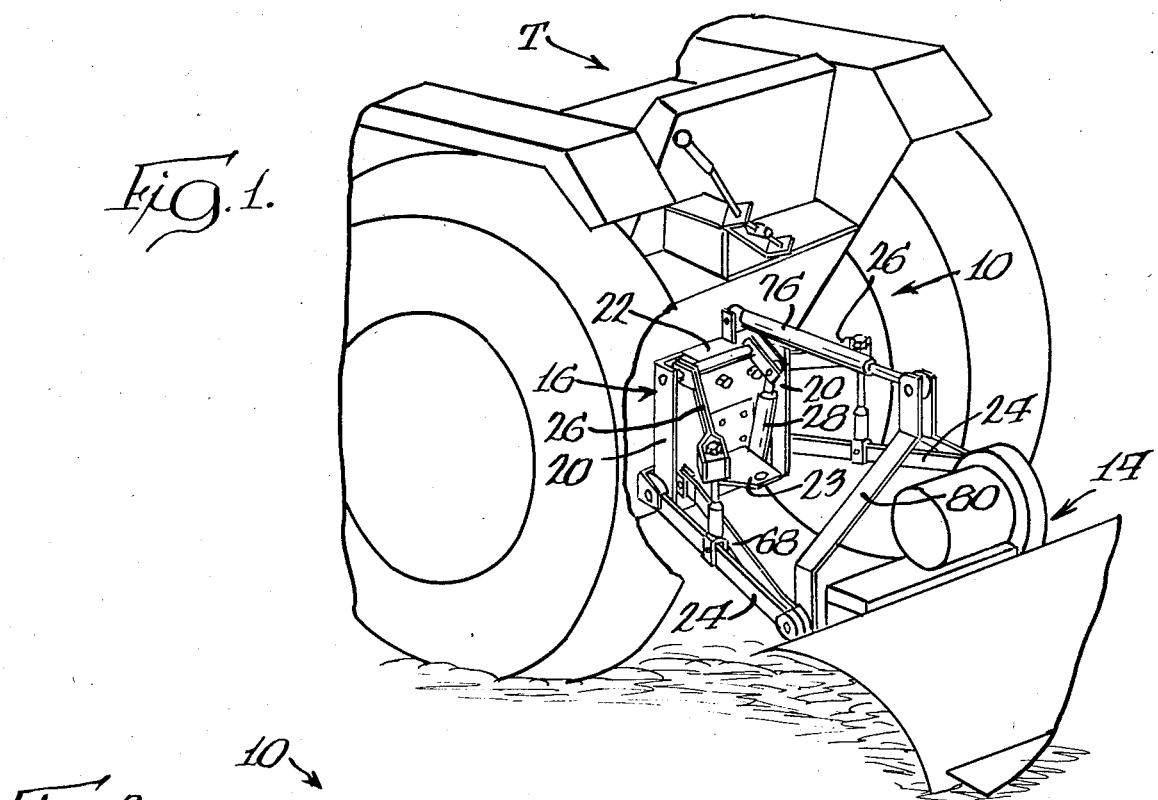
FIG. 1 is a perspective view of a three-point hitch arrangement embodying the principles of the present invention mounted for use on a tractor, with certain conventional elements omitted for clarity of illustration.
Figure 2:
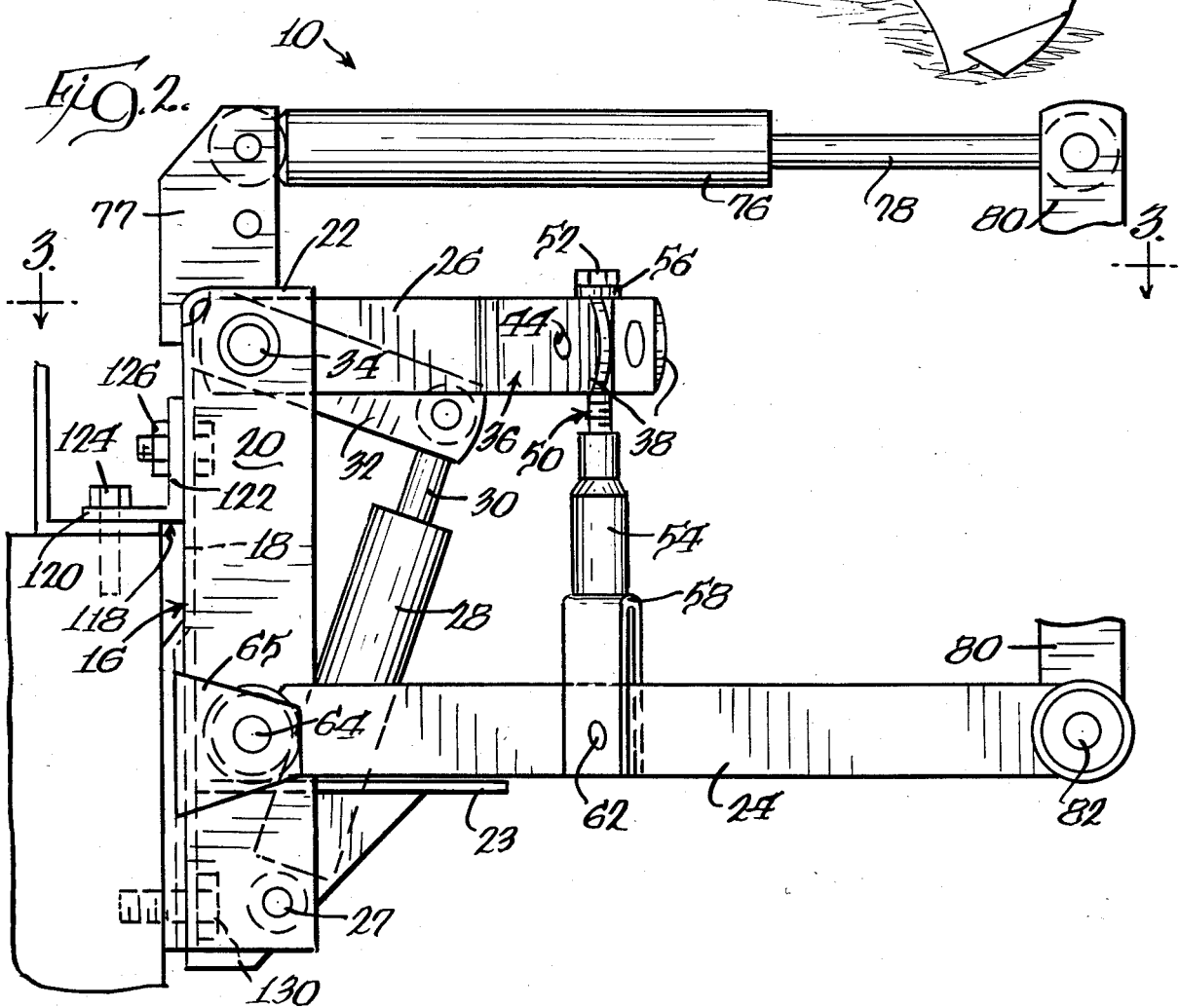
FIG. 2 is an enlarged fragmentary, side elevational view of the three-point hitch arrangement shown in FIG. 1, illustrating the mounting arrangement of the three-point hitch arrangement of the present invention.

With reference to FIGS. 1 and 2, a three-point hitch 10 of a tractor T is illustrated supporting a ground engaging implement 14, illustrated as a rotary cultivator. The three-point hitch arrangement 10 comprises an integrated mounting plate 16 having a central wall 18, a pair of side walls 20, and an integrally formed top wall 22 extending rearwardly from the central wall. As will be further described, the mounting plate 16 may be detachably fixedly connected to the tractor or the like by means of an invertible bracket and fastener arrangement. For added versatility, mounting plate 16 preferably includes an integral, rearwardly extending drawbar 23.

As shown, the integrated three-point tractor hitch 10 includes a pair of laterally spaced lower hitch arms 24 pivotally connected to and extending rearwardly of mounting plate 16. The hitch further includes a pair of upper hitch arms 26 pivotally connected to and extending rearwardly of mounting plate 16 in vertically spaced relationship with respect to the lower hitch arms 24. A fluid motor or hydraulic actuator 28, having one end connected to the central wall 18 of the mounting plate 16 at 27, includes an extensible piston 30 connected to a link member 32 attached to an upper arm shaft 34 to which upper hitch arms 26 are each fixedly connected. The upper arm shaft 34 is pivotally mounted on each of the side walls 20 of mounting plate 16, and thus the upper arms are pivotally raised and lowered through operation of the hydraulic actuator 28.

As illustrated in FIGS. 3 and 4, the distal end of each upper hitch arm 26 opposite the end pivotally connected with mounting plate 16 includes a forked bifurcated receiving portion 36. Each receiving portion comprises a pair of flanges 38 adapted to receive a generally rectangular connector block 40. Each connector block 40 is pivotally connected to the receiving portion flanges 38 with pivot pins 44. The pivot pins 44 define a respective first pivotal axis about which the connector block is pivotal with respect the upper arm 24 to which it is attached.

Each connector block 40 receives a connector pin 46 pivotal about a respective second axis disposed perpendicular to the respective first pivotal axis. Each connector pin 46 includes a bore 48 therein adapted to receive a shaft 50. Construction in this manner allows each shaft 50 to be pivot about both the respective first and second pivotal axis relative to the respective one of upper arms 26. A pair of spacing members 47 are carried by each pin 46 on respective opposite sides of its respective shaft 50 to limit the movement of pin 46 axially of the respective axis, with pin 46 and shaft 50 thus maintained in a centered disposition relative to the respective connector block 40. Each shaft 50 is relatively movable within the connector pin bore 48 for limited relative vertical movement. Further, each shaft 50 is limited in its relative downward movement through connector pin 46 by the shaft's enlarged head portion 52 at one end, with relative upward movement limited by a clevis 54 threadably engaged with the threaded shank of the shaft at its other end. Thus, the length of the link thereby formed from shaft 50 and clevis 54 is adjustable, with the link thereby adjustably interconnecting the respective upper and lower hitch arms 26 and 24.

Each shaft's movement about its respective second pivotal axis is limited by a protective spacer 56. The spacer 56 is disposed about shaft 50 between head portion 52 of shaft 50 and spacing members 47 on connector pin 46. The spacer 56 is freely vertically movable on shaft 50. Disposition of spacer 56 about shaft 50 prevents the shaft from engaging connector block 40 attendant to movement about the respective second pivotal axis, thereby preventing damage to the shaft or the connector block. Further, the shaft's protection is maintained by spacer 56 throughout the shaft's relative vertical movement with respect to the connector block since the spacer is freely movable on the shaft. Therefore, the spacer will always fall to the spacing members 47 on connector pin 46 as the shaft is moved vertically upward through the connector pin bore.

Each clevis 54 defines a forked portion 58 which receives a respective one of the lower hitch arms 24, with each clevis 54 pivotally connected to a respective one of the lower arms at connection pin 62.

The pair of lower hitch arms 24 are each pivotally mounted to the mounting plate 16 by a respective mounting pin 64 extending through side wall 20 of the mounting plate and a mounting bracket 65. Notably, a spherical bearing 66 pivotally mounts each lower arm 24 on its respective mounting pin 64 for pivotal movement about a horizontal axis, as well as for limited lateral pivotal movement.

A stabilizer bar 68 is also mounted on mounting plate 16 by a pair of support members 70. The stabilizer member 68 is mounted to the support members 70 for vertical pivotal movement with respect to the ground and, is further connected to the distal end of the lower hitch arm 24 mounted generally adjacent thereto. Thus, the stabilizer member resists and dampens lateral movement of the lower hitch arm 24 about its spherical bearing 66, thus resisting side loading of the hitch-mounted implement.

A hydraulic actuator 76 of conventional construction forms the upper point of the present three-point hitch's construction, and is mounted on mounting plate 16 at bracket 77, and includes an extensible piston 78 pivotally connected to a yoke 80 of the implement hitch. The yoke 80 is pivotally connected to each lower arm 24 at 82 at the distal end of each lower arm. Yoke 80 supports the ground engaging implement carried by the tractor, with the connection of the yoke 80 and each lower hitch arm 24 forming two of the three hitch points defined by the three-point hitch arrangement. The third point is the yoke's connection to the mounting plate 16 through the hydraulic actuator 76 and its extensible piston 78. Therefore, the ground engaging implement is pivotal about the lower hitch arm's connections with yoke 80 attendant operation of hydraulic actuator 76. As will be recognized, a member of adjustable length such as a turnbuckle or the like can be employed instead of actuator 76 to provide the upper adjustable member of the present hitch.

Figure 6:
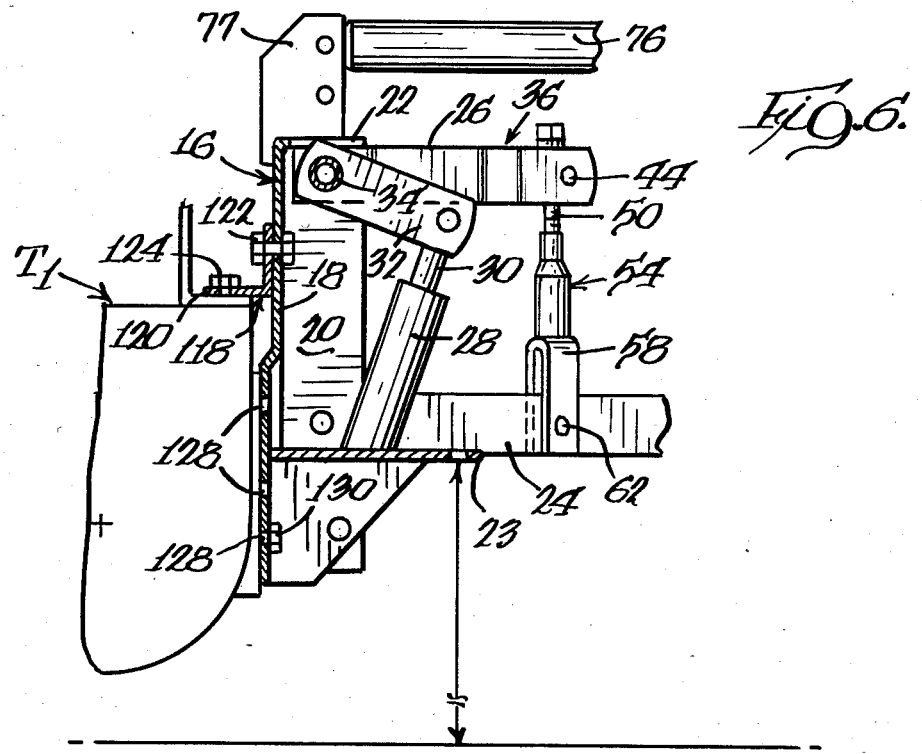
FIG. 6 is a side elevational view, in partial cross-section, illustrating the mounting of the present three-point hitch arrangement on a tractor having relatively low attachment points.
Figure 7:
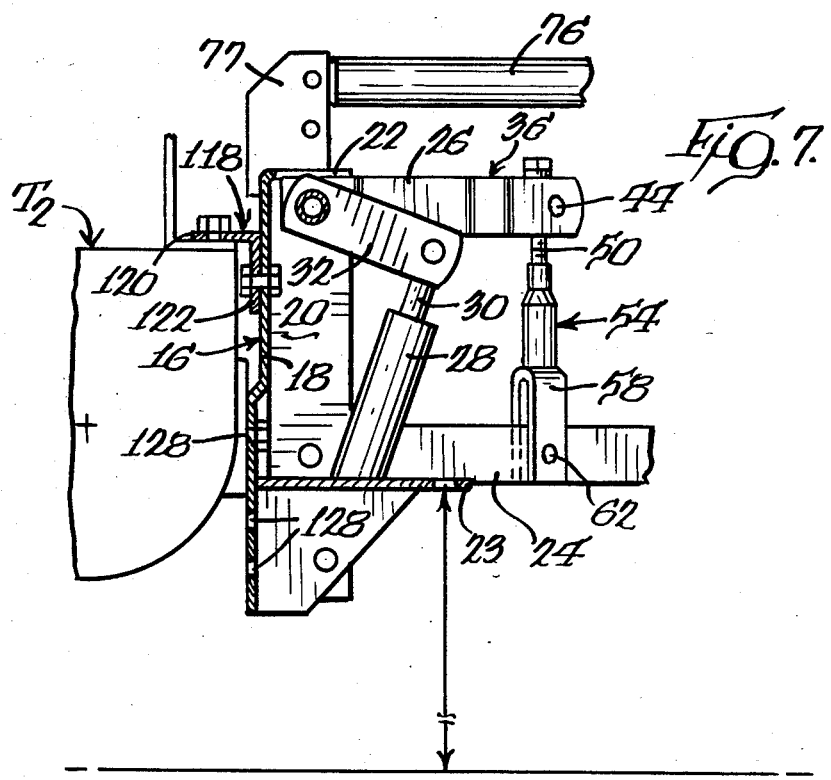
FIG. 7 is a view similar to FIG. 6 illustrating mounting of the present three-point hitch arrangement on a tractor having relatively high attachment points.

Referring now to FIGS. 6 and 7, an improved construction for the mounting arrangement of the present improved integrated three-point hitch arrangement is illustrated. Significantly, the improved mounting arrangement permits the entire three-point hitch arrangement to be mounted as a unit on different tractors, or the like, having associated attachment points at differing elevations, with the three-point hitch arrangement still being mounted at the same general vertical elevation from the ground.

In FIG. 6, a portion of tractor $T_1$ is illustrated having associated three-point hitch attachment points which are relatively low to a the ground. In contrast, FIG. 7 illustrates a tractor $T_2$ having three-point hitch attachment points which are relatively high from the ground. In order to accommodate mounting of the present three-point hitch on different tractors having attachment points at different elevations, the mounting assembly includes an invertible bracket arrangement. Specifically, the assembly includes an invertible bracket 118, which in the illustrated embodiment is configured with a generally L-shaped cross-section. The bracket 118 includes a flange portion 120 for effecting a releasable fixed connection with a tractor, and a flange portion 122, which is perpendicular with respect to flange 120, and which is provided for effecting a releasable connection with the central wall 18 of mounting plate 16. To this end, fasteners 124 are provided for coaction with flange 120 for affixing bracket 118 to a tractor, with fasteners 126 provided for connecting flange 122 of the bracket to central wall 18.

The mounting arrangement further includes a plurality of spaced height selection holes 128 linearly arranged within the central wall 18 of mounting plate 16. It will be noted that height selection holes 128 are arranged such that one of the holes will be in substantial alignment with the mounting hole on a given tractor to facilitate mounting of the mounting plate and attached three-point hitch arrangement to the tractor.

Referring now to FIG. 6, the above-described mounting arrangement is illustrated in association with tractor $T_1$ having associated attachment points which are relatively low. For mounting the three-point hitch on this tractor, fasteners 124 are used to affix the bracket 118 to tractor $T_1$ so that the flange 122 of the bracket is positioned above flange 120 of the bracket. One of the height adjustment holes 128 is also substantially aligned with the mounting hole on the tractor such that a second fastener 130 may be inserted within the aligned height adjustment hole. In this first, upright position of the bracket 118 and the first aligned position of height adjustment holes 128, the bracket and height adjustment holes appear generally as illustrated in FIG. 6.

Referring now to FIG. 7, the mounting arrangement is illustrated in association with a tractor $T_2$ having associated attachment points which are relatively higher than the attachment points of the above-described tractor $T_1$. In order to permit the three-point hitch to be correctly positioned with respect to the ground for its full range of vertical movement, the bracket 118 is inverted from its position illustrated in FIG. 6 to its position illustrated in FIG. 7. In the second, inverted position of the bracket, flange 122 is positioned below flange 120 of bracket 118, and the height adjustment holes 128 are positioned such that a different height adjustment hole is substantially aligned with the mounting holes on the rear of tractor $T_2$ allowing releasable connection of the mounting plate with the tractor. Mounting plate 16 of the three-point hitch arrangement can then be releasable fixedly connected to the bracket and the mounting hole of the tractor with fasteners 126 and 130.

As will be recognized, the versatility provided by the above-described mounting arrangement is particularly desirable for mounting of the present integrated three-point hitch. This is due to the fact that the three-point hitch is movable through a generally fixed range of vertical movement, and it is desirable to maintain the full available range of vertical movement of the three-point hitch and its attached ground engaging implement regardless of the height of the attachment points of its associated tractor or the like.

From the foregoing, it will be observed that numerous variations and modifications may be effected without departing from the true spirit and scope of the novel concept of the present invention. It will be understood that no limitation with respect to the specific embodiment illustrated herein is intended or should be inferred. It is, of course, intended to cover by the appended claims all such modifications as fall within the scope of the claims.

What is claimed is:

1. An improved three-point hitch arrangement adapted to be mounted to a tractor, or the like, comprising:

mounting means for effecting a fixed connection with said tractor;

a pair of upper arms pivotally connected with said mounting means for vertical movement with respect thereto;

a pair of lower arms pivotally connected with said mounting means for vertical movement with respect thereto spaced below said upper arm means;

a pair of link means extending between and interconnecting respective ones of said upper arms and said lower arms;

a pair of connector means operatively respectively connecting said upper arms and each said link means for pivotal movement of said link means with respect to said upper arms about respective first and second perpendicular axes, each said connector means comprising connector block means, first means for pivotally connecting said connector block means with the respective one of said upper arms for relative movement with respect to said respective upper arm about said respective first axis, and connector pin means extending through said connector block means along said respective second axis for relative pivotal movement about said second axis, said connector pin means defining a bore receiving the respective one of said link means for movement within said bore, whereby each said connector means and the respective one of said link means cooperate to permit sufficient limited upward vertical movement of said link means relative to said connector means whereby said lower arms are movable vertically without corresponding vertical movement of said upper arms to provide floating of an associated implement mounted on said hitch arrangement; and motor means operatively connected to at least one of said upper arms for raising and lowering said upper and lower arms in unison.

2. The improved three-point hitch arrangement of claim 1, wherein each said connector block means comprises a connector block of generally rectangular configuration;

each of said upper arms including a free end having a receiving portion of bifurcated construction having flanges adapted to receive the respective one of said generally rectangular connector blocks.

3. The improved three-point hitch arrangement of claim 2, wherein each of said link means comprises a threaded shaft including a head portion at one end, each said link means further including a threaded clevis adapted to receive said shaft for adjusting the relative length of said link means.

4. The improved three-point hitch arrangement of claim 1, wherein said mounting means is adapted to permit said three-point hitch arrangement to be mounted at generally the same height from the ground on different tractors having associated attachment points at different heights from the ground.

5. The improved three-point hitch arrangement of claim 4, wherein said mounting means comprises a mounting plate to which said upper and lower arms are pivotally connected, and invertible bracket means for releasably fixedly connecting said mounting plate to said tractor.

6. The improved three-point hitch arrangement of claim 5, wherein said invertible bracket means comprise an invertible bracket, said mounting plate defining a plurality of vertically spaced holes for adjustable connection with respect to said tractor.

7. An improved three-point hitch arrangement adapted to be mounted to a tractor or the like, comprising:

mounting means for effecting a fixed connection with said tractor;

a pair of lower arms pivotally connected with said mounting means;

a pair of upper arms pivotally connected with said mounting means and spaced above said lower arms, each of said upper arms including a free end having a receiving portion of bifurcated construction and having a pair of flanges;

a pair of links respectively connecting said upper and lower arms and including a pair of shafts each threaded at one end and each including a head portion at the other end, each of said shafts extending generally between the receiving portion of a respective one of said pair of upper arms and a respective one of said pair of lower arms;

a pair of connector means respectively connecting each of said pair of shafts with a respective one of said bifurcated receiving portions, each said connector means including a rectangular connector block pivotally connected to the respective receiving portion with a pair of pivot pins for relative movement about a respective first axis, a connector pin extending through said rectangular connector block along a respective second axis perpendicular to the respective first axis for pivotal movement about the second axis with respect to the connector block with a respective one of said shafts extending through said connector pin for limited relative vertical movement, and protective spacer means mounted and freely movable on each of said shafts between the respective connector pin and said shaft head portion, said spacer means being adapted to contact said rectangular connector block attendant to movement of said shaft about the respective second axis to prevent contact between said shaft and said connector block; and motor means operatively connected to said pair of upper arms for raising and lowering said upper and lower arms in unison.

8. The improved, three-point hitch arrangement of claim 7, including spherical bearing means pivotally connecting each of said lower arms with said mounting means for allowing relative lateral pivotal movement of said lower arms with respect to said mounting means.

9. The improved three-point hitch arrangement of claim 8, including a pair of threaded clevises respectively threaded to said one ends of said shafts and respectively pivotally connected to said lower arms.

10. The improved three-point hitch arrangement of claim 9, wherein said motor means comprises a hydraulic actuator connected with said mounting means, said arrangement including a connecting shaft interconnecting said pair of upper arms, and a connecting link operatively connecting said hydraulic actuator with said connecting shaft.

11. The improved three-point hitch arrangement of claim 10, including a stabilizer bar connected between the distal end of one of said pair of lower arms and said mounting means for resisting relative lateral movement of said lower arms with respect to said mounting means.

12. The improved three-point hitch arrangement of claim 11, wherein said mounting means comprises a mounting plate to which said upper and lower arms are pivotally connected, said mounting plate defining a plurality of vertically spaced openings for adjustable mounting of said mounting plate on said tractor, said mounting means further comprising an invertible bracket of generally L-shaped cross-section for releasably fixedly connecting said mounting plate to said tractor in respective upright and inverted positions of said bracket such that said three-point hitch arrangement may be mounted at generally the same height from the ground on different tractors having associated attachment points at different heights from the ground.

13. An integrated three-point hitch arrangement adapted to be mounted as a unit on a tractor or the like, comprising:

mounting means including a mounting plate adapted for fixed connection of said three-point hitch arrangement with said tractor;

a pair of upper arms pivotally connected with said mounting plate for relative vertical movement with respect thereto;

a pair of lower arms pivotally connected with said mounting plate for relative vertical movement with respect thereto and spaced below said upper arms;

a pair of link means extending between respective ones of said upper arms and said lower arms for pivotally interconnecting each of said upper arms with a respective one of said lower arms;

connector means operatively connecting each of said upper arms with a respective one of said link means for universal movement of each said link means relative to the respective one of said upper arms about respective first and second perpendicular axes, each said connector means comprising connector block means, first means for pivotally connecting said connector block means with the respective one of said upper arms for relative movement with respect to said respective upper arm about said respective first axis, and connector pin means extending through said connector block means along said respective second axis for relative pivotal movement about said second axis, said connector pin means defining a bore receiving the respective one of said link means for movement within said bore, whereby each said connector means and the respective one of said link means cooperate to permit sufficient limited upward vertical movement of said link means relative to said connector means whereby said lower arms are movable vertically without corresponding vertical movement of said upper arms to provide floating of an associated implement mounted on said hitch arrangement;

motor means operatively connected to said pair of upper arms for raising and lowering said upper and lower arm pairs in unison;

a mounting yoke connected to the ends of said lower arms opposite said mounting means, said yoke extending upwardly from said lower arms; and adjustable upper means interconnecting the upper end of said yoke and said mounting means.

14. The integrated three-point hitch assembly of claim 13, wherein said mounting means further includes an invertible bracket for releasably fixed connecting said mounting plate to said tractor to permit said three-point hitch arrangement to be mounted at generally the same height from the ground on different tractors having associated attachment points at differing heights from the ground.

15. The integrated three-point hitch arrangement of claim 14, including spherical bearing means pivotally connecting each of said lower arms to said mounting plate to allow relative lateral pivotal movement of each of said lower arms with respect to said mounting plate.

16. An improved three-point hitch arrangement adapted to be mounted to a tractor, or the like, comprising:

mounting means for effecting a fixed connection with said tractor;

a pair of upper arms pivotally connected with said mounting means for vertical movement with respect thereto;

a pair of lower arms pivotally connected with said mounting means for vertical movement with respect thereto spaced below said upper arm means;

a pair of link means extending between and interconnecting respective ones of said upper arms and said lower arms;

a pair of connector means operatively respectively connecting said upper arms and each said link means for pivotal movement of said link means with respect to said upper arms about respective first and second perpendicular axes;

motor means operatively connected to at least one of said upper arms for raising and lowering said upper and lower arms in unison, each said connector means comprising a connector block, first means for pivotally connecting said connector block with the respective one of said pair of upper arms for relative movement with respect thereto about said respective first axis, and second means for connecting each of said connector blocks to the respective one of said link means for relative movement of said respective link means about said respective second axis, each said connector block being of generally rectangular configuration, and each of said upper arms including a free end having a receiving portion of bifurcated construction having flanges adapted to receive the respective one of said generally rectangular connector blocks, each said second connecting means including a connector pin extending through a respective one of said rectangular connector blocks along the respective second pivotal axis, each said link means extending through a respective one of said connector pins for limited relative vertical movement with respect thereto, each of said link means comprising a threaded shaft including a head portion at one end, each said link means further including a threaded clevis adapted to receive said shaft for adjusting the relative length of said link means, and protective spacer means carried by each said shaft between the head portion thereof and the respective one of said connector pins, said protective spacer means being adapted to contact said connector blocks attendant to movement of each said link means about said respective second axis for preventing contact between said shafts and said connector blocks.

17. An integrated three-point hitch arrangement adapted to be mounted as a unit on a tractor or the like, comprising:

mounting means including a mounting plate adapted for fixed connection of said three-point hitch arrangement with said tractor;

a pair of upper arms pivotally connected with said mounting plate for relative vertical movement with respect thereto;

a pair of lower arms pivotally connected with said mounting plate for relative vertical movement with respect thereto and spaced below said upper arms;

a pair of link means extending between respective ones of said upper arms and said lower arms for pivotally interconnecting each of said upper arms with a respective one of said lower arms;

connector means operatively connecting each of said upper arms with a respective one of said link means;

motor means operatively connected to said pair of upper arms for raising and lowering said upper and lower arm pairs in unison;

a mounting yoke connected to the ends of said lower arms opposite said mounting means, said yoke extending upwardly from said lower arms;

adjustable upper means interconnecting the upper end of said yoke and said mounting means, said mounting means including an invertible bracket for releasably fixedly connecting said mounting plate to said tractor to permit said three-point hitch arrangement to be mounted at generally the same height from the ground on different tractors having associated attachment points at differing heights from the ground, and spherical bearing means pivotally connecting each of said lower arms to said mounting plate to allow relative lateral pivotal movement of each of said lower arms with respect to said mounting plate, said pair of link means comprising a pair of shafts each having an enlarged head portion and a threaded shank portion, said connector means comprising a pair of rectangular connector blocks each adapted to be pivotally connected to one of said upper arms for relative pivotal movement about a respective first axis, a pair of connector pins each extending through a respective one of said connector blocks for pivotal movement with respect thereto along a respective second axis perpendicular to the respective first axis, each connector pin receiving therethrough for limited relative vertical movement a respective one of said shafts, and protective spacer means mounted and freely movable on each of said shafts disposed between said head portion of each of said shafts and each of said connector pins, said spacer means being adapted to contact said rectangular connector blocks attendant to movement of said shafts relative to the respective one of said second axes to prevent contact between said shafts and said connector blocks.

18. The integrated three-point hitch arrangement of claim 17, wherein said motor means comprises a hydraulic actuator connected to said mounting plate, said arrangement including a connecting shaft interconnecting said upper arms and a connecting link operatively connecting said hydraulic actuator with said connecting shaft for raising and lowering of said upper arms and said lower arms in unison.

* * * * *